US010977217B2

(12) United States Patent
Bhutani et al.

(10) Patent No.: US 10,977,217 B2
(45) Date of Patent: Apr. 13, 2021

(54) METHOD AND SYSTEM TO EFFICIENTLY RECOVERING A CONSISTENT VIEW OF A FILE SYSTEM IMAGE FROM AN ASYNCHRONOUSLY REMOTE SYSTEM

(71) Applicant: EMC IP Holding Company LLC, Hopkinton, MA (US)

(72) Inventors: Neeraj Bhutani, Pune (IN); Kalyan Chakravarthy Gunda, Bangalore (IN); Nitin Madan, Gurugram (IN); Jayasekhar Konduru, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 16/176,601

(22) Filed: Oct. 31, 2018

(65) Prior Publication Data

US 2020/0134053 A1     Apr. 30, 2020

(51) Int. Cl.
    *G06F 16/00*     (2019.01)
    *G06F 16/178*    (2019.01)
    *G06F 16/182*    (2019.01)
    *G06F 16/174*    (2019.01)

(52) U.S. Cl.
    CPC ........ *G06F 16/178* (2019.01); *G06F 16/1748* (2019.01); *G06F 16/1844* (2019.01)

(58) Field of Classification Search
    CPC ............... G06F 16/178; G06F 16/1844; G06F 16/1748; G06F 16/162; G06F 16/168; G06F 16/166; G06F 16/1727; G06F 16/183
    See application file for complete search history.

(56) References Cited

U.S. PATENT DOCUMENTS

| 6,480,970 | B1 * | 11/2002 | DeKoning | .......... G06F 11/2069 714/5.11 |
| 7,809,898 | B1 * | 10/2010 | Kiselev | ............... G06F 11/2082 711/152 |
| 8,190,835 | B1 | 5/2012 | Yueh | |

(Continued)

FOREIGN PATENT DOCUMENTS

| EP | 2738665 A1 | 6/2014 |
| WO | 2013115822 A1 | 8/2013 |
| WO | 2014185918 A1 | 11/2014 |

OTHER PUBLICATIONS

Deepavali Bhagwat et al.; "Extreme Binning: Scalable, Parallel Deduplication for Chunk-based File Backup"; IEEE MASCOTS; Sep. 2009 (10 pages).

(Continued)

*Primary Examiner* — Alexander Khong
(74) *Attorney, Agent, or Firm* — Chamberlain, Hrdlicka, White, Williams & Aughtry

(57) ABSTRACT

A method for managing storage devices includes, in response to a first determination that a first cloud storage device is inaccessible to a local storage device, obtaining metadata objects from a second cloud storage device, identifying, based on a sync time analysis, at least one metadata object of the metadata objects to be deleted, initiating the deletion of the at least one metadata object on a second cloud storage device, wherein the second cloud storage device is accessible to the local storage device, and updating, after initiating the deletion of the at least one metadata object, a namespace on a local storage device.

20 Claims, 7 Drawing Sheets

(56) References Cited

U.S. PATENT DOCUMENTS

| | | | |
|---|---|---|---|
| 8,396,841 | B1 | 3/2013 | Janakiraman |
| 8,898,114 | B1 | 11/2014 | Feathergill et al. |
| 8,898,120 | B1 | 11/2014 | Efstathopoulos |
| 8,918,390 | B1 | 12/2014 | Shilane et al. |
| 8,949,208 | B1 | 2/2015 | Xu et al. |
| 9,715,507 | B2 * | 7/2017 | Brand ................... G06F 16/182 |
| 9,830,111 | B1 | 11/2017 | Patiejunas et al. |
| 10,002,048 | B2 | 6/2018 | Chennamsetty et al. |
| 10,031,672 | B2 | 7/2018 | Wang et al. |
| 2004/0083240 | A1 * | 4/2004 | Sekine ................... G06F 16/27 |
| 2009/0235115 | A1 | 9/2009 | Butlin et al. |
| 2010/0094817 | A1 | 4/2010 | Ben-Shaul et al. |
| 2011/0099351 | A1 | 4/2011 | Condict |
| 2011/0196869 | A1 | 8/2011 | Patterson et al. |
| 2013/0138620 | A1 | 5/2013 | Yakushev et al. |
| 2014/0258248 | A1 | 9/2014 | Lambright et al. |
| 2014/0258824 | A1 | 9/2014 | Khosla et al. |
| 2014/0310476 | A1 | 10/2014 | Kruus et al. |
| 2015/0019491 | A1 * | 1/2015 | Hunt ................... G06F 11/2079 707/639 |
| 2015/0106345 | A1 | | 4/2015 | Trimble et al. |
| 2015/0261776 | A1 | | 9/2015 | Attarde |
| 2017/0004055 | A1 * | 1/2017 | Horan ................. H04L 65/4076 |
| 2018/0260125 | A1 * | 9/2018 | Botes ...................... G06F 3/067 |
| 2019/0188309 | A1 * | 6/2019 | Anderson ........... G06F 16/1734 |

OTHER PUBLICATIONS

International Search Report and Written Opinion issued in corresponding PCT Application PCT/US2018/027646, dated Jul. 27, 2018. (30 pages).

International Search Report and Written Opinion issued in corresponding WO Application No. PCT/US2018/027642, dated Jun. 7, 2018 (15 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

Extended European Search Report issued in corresponding EP Application No. 19204844.5, dated Apr. 14, 2020 (8 pages).

* cited by examiner

METHOD AND SYSTEM TO EFFICIENTLY RECOVERING A CONSISTENT VIEW OF A FILE SYSTEM IMAGE FROM AN ASYNCHRONOUSLY REMOTE SYSTEM

BACKGROUND

Computing devices generate and storage large amounts of data. Over time, the data that is stored may be transferred to a remote storage system. Depending on how the data is initially stored by the computing device, and how the data is stored on the remote storage system, it may be difficult to efficiently manage the locally stored data and the remotely stored data.

SUMMARY

In one aspect, a method for managing storage devices in accordance with one or more embodiments of the invention includes, in response to a first determination that a first cloud storage device is inaccessible to a local storage device, obtaining metadata objects from a second cloud storage device, identifying, based on a sync time analysis, at least one metadata object of the metadata objects to be deleted, initiating the deletion of the at least one metadata object on a second cloud storage device, wherein the second cloud storage device is accessible to the local storage device, and updating, after initiating the deletion of the at least one metadata object, a namespace on a local storage device.

In one aspect, a local storage device includes a processor and memory comprising instructions, which when executed by the processor, perform a method. The method includes, in response to a first determination that a first cloud storage device is inaccessible to a local storage device, obtaining metadata objects from a second cloud storage device, identifying, based on a sync time analysis, at least one metadata object of the metadata objects to be deleted, initiating the deletion of the at least one metadata object on a second cloud storage device, wherein the second cloud storage device is accessible to the local storage device, and updating, after initiating the deletion of the at least one metadata object, a namespace on a local storage device.

In one aspect, a non-transitory computer readable medium comprising computer readable program code, which when executed by a computer processor enables the computer processor to perform a method. The method includes, in response to a first determination that a first cloud storage device is inaccessible to a local storage device, obtaining metadata objects from a second cloud storage device, identifying, based on a sync time analysis, at least one metadata object of the metadata objects to be deleted, initiating the deletion of the at least one metadata object on a second cloud storage device, wherein the second cloud storage device is accessible to the local storage device, and updating, after initiating the deletion of the at least one metadata object, a namespace on a local storage device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for maintaining a consistent view of the files across multiple computing devices. More specifically, embodiments of the invention perform methods for identifying and removing portions of data from a local storage device that are not consistent with data stored on remote storage systems (also referred to as cloud storage systems or devices). This may occur, for example, after a cloud storage device in the cloud storage system is made unavailable to (e.g., it can be accessed by) the computing device. Embodiments of the invention include methods and systems for addressing such scenarios.

Figure 1:
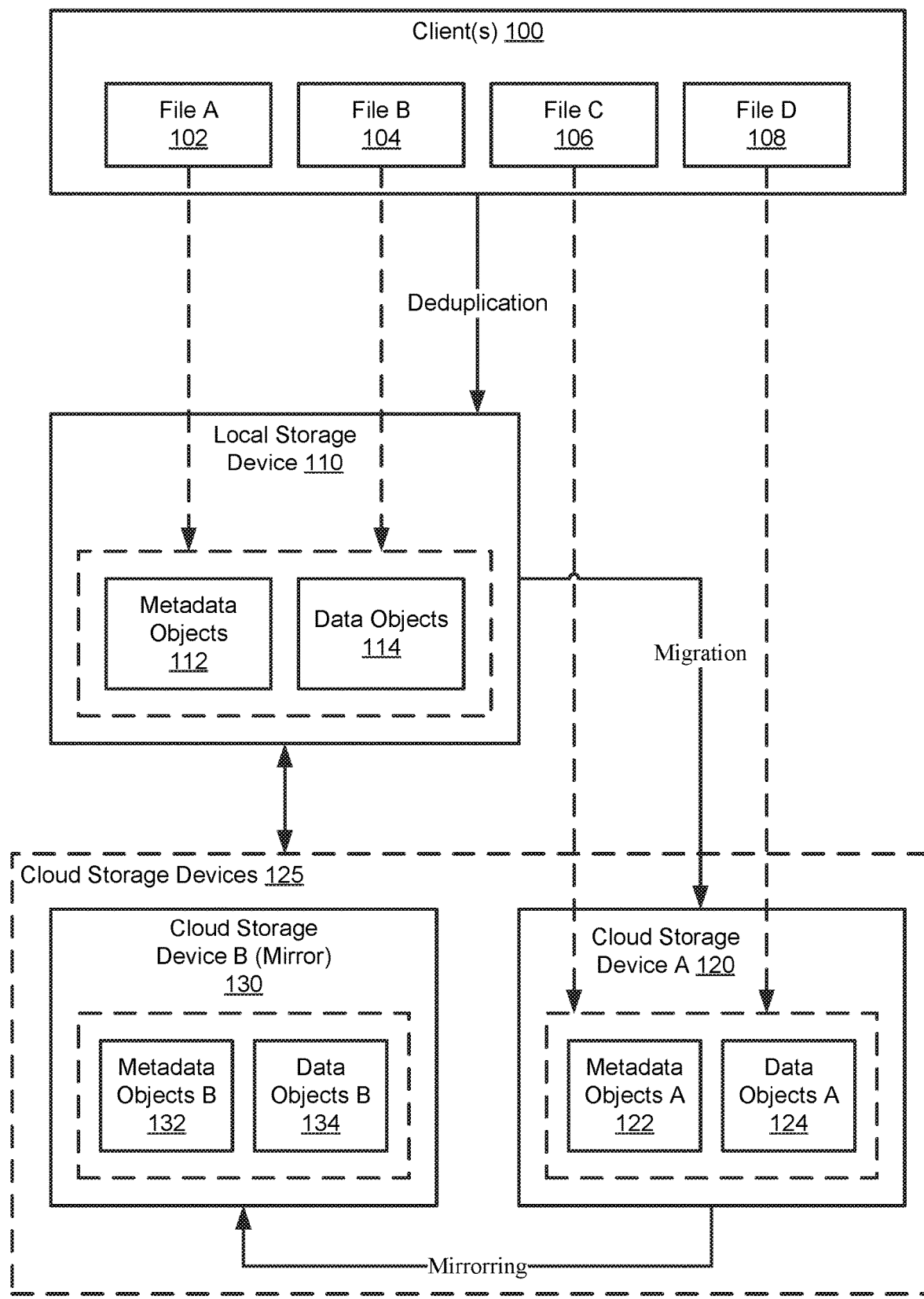
FIG. 1 shows a diagram of a system in accordance with one or more embodiments of the invention.

FIG. 1 shows an example system in accordance with one or more embodiments of the invention. The system includes any number of clients (100), a local storage device (110), and any number of cloud storage devices (120, 130). Each component of the system of FIG. 1 may be operably connected via any combination of wired and/or wireless connections. Each component of the system is discussed below.

In one or more embodiments of the invention, the client(s) (100) store files (e.g., File A (102), File B (104), File C (106), File D (108)). Each client may include functionality to create, modify and delete files. Further, each client may also include functionality to transfer files to a local storage device (110) and, in such scenarios, the client may also track which files have been stored on the local storage device (110).

In one or more embodiments of the invention, the files may be deduplicated prior to being stored on the local storage device (110). The deduplication may be performed by the client (100) or the local storage device (110).

In one embodiment of the invention, de-duplicating the files, before storing the files in the local storage device (110), may increase the amount of files that can be stored in the local storage device (110) when compared to the amount of files that can be stored in the local storage device (110) without de-duplicating the files. De-duplicating the files may also decrease the cost associated with storing files in the local storage device (110) by reducing the total amount of storage required to store the de-duplicated files when compared to the amount of storage required to store the files without being de-duplicated.

As used herein, deduplication refers to methods of storing only portions of files (also referred to as objects, e.g., metadata objects and data objects) that are not already stored in the local storage device (110). For example, when multiple versions of a large file, having only minimal differences between each of the versions, are stored without deduplication, storing each version will require approximately the same amount of storage space in the local storage device (110). In contrast, when the multiple versions of the large file are stored with deduplication, only the first version of the multiple versions stored will require a substantial amount of storage. Once the first version is stored in the local storage device (110), the subsequent versions of the large file subsequently stored will be de-duplicated before being stored in the local storage device (110) resulting in much less storage space of the local storage device (110) being required to store the subsequently stored versions when compared to the amount of storage space of the local storage device (110) required to store the first stored version.

Continuing with the discussion of FIG. 1, the deduplicated data (i.e., the data resulting from performing deduplication on the files) may include metadata objects (112) and data objects (114). The metadata objects (112) include metadata (e.g., the file name, file size, the data objects that are associated with the metadata object, etc.) associated with one or more files that are stored in the local storage device (110) and the data objects (114) include the data (i.e., data other than metadata) associated with the one or more files that are stored in the local storage device (110).

Figure 4:
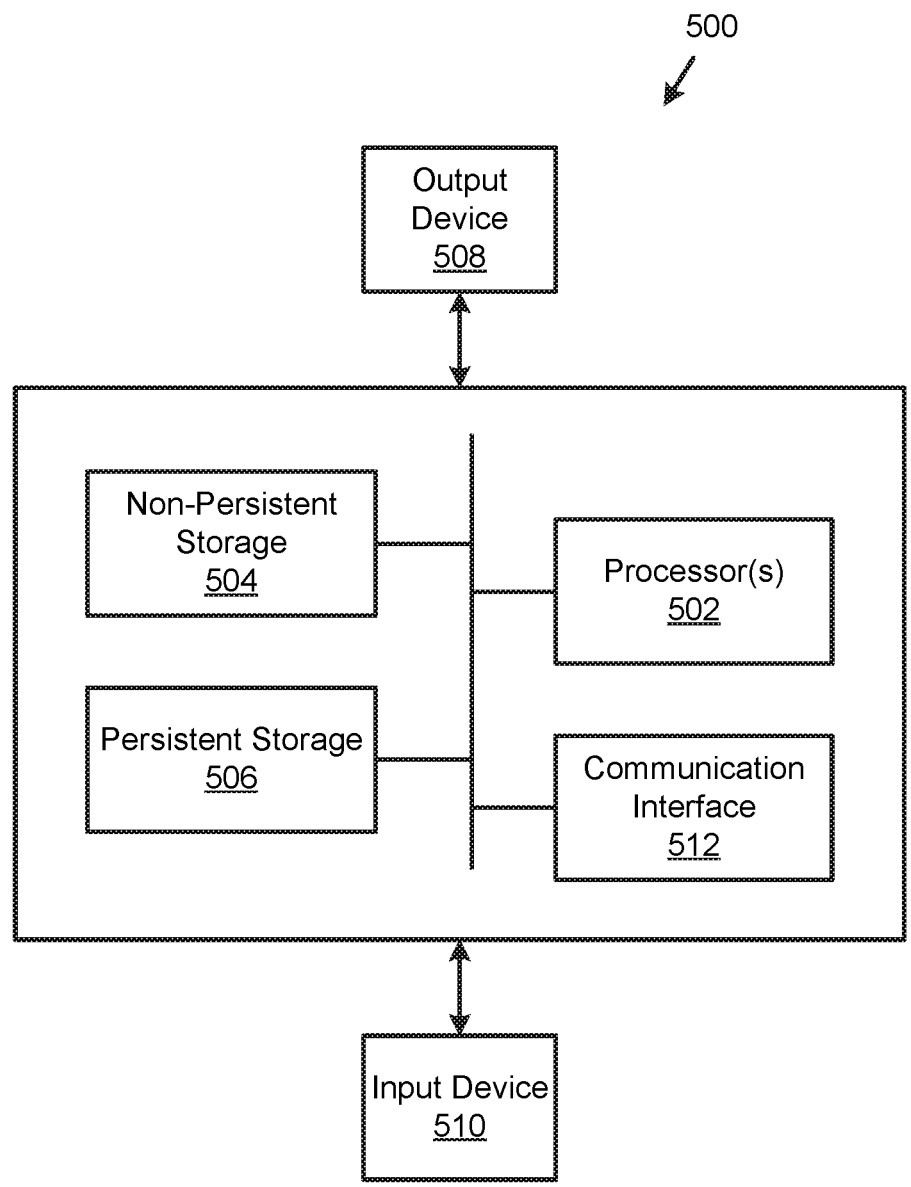
FIG. 4 shows a diagram of a computing device in accordance with one or more embodiments of the invention.

In one or more embodiments of the invention, the client(s) (100) are implemented as computing devices (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the local storage device (110) stores data (e.g., metadata objects (112) and data objects (114)). The local storage device (110) may store additional data without departing from the invention. Further, the local storage device may provide the stored data to the clients and migrate the stored data to one or more cloud storage devices (125).

In one or more embodiments of the invention, the metadata objects (112) and data objects (114) are migrated from the local storage device (110) to cloud storage A (120). The local storage device (110) may migrate the metadata objects (112) by generating a copy of the metadata objects (112) and sending the copy to cloud storage A (112). The local storage device may migrate the data objects (114) by moving the data objects (114) from the local storage device (110) to cloud storage device A (120). In other words, after migration, the metadata objects (112) may remain in the local storage device (110) while the data objects (114) are no longer in the local storage device (110).

The local storage device (110) may perform the migration of files in order to move files from the local storage device to a cloud storage device (120) include order to free-up storage on the local storage device. The local storage device may use any rule or heuristic to determine whether to migrate a given file. For example, a file may be migrated if it has not been accessed for a certain period of time or if the file has been stored on the local storage device for a given period of time. These examples are not intended to limit the invention.

In one embodiment of the invention, the local storage device includes functionality to take action in response to a cloud storage device (125) becoming in accessible. The actions (or methods) performed by the local storage device in such scenarios are described in FIGS. 2A-2C. The local storage device may perform different and/or additional actions without departing from the invention.

In one or more embodiments of the invention, the local storage device (110) is implemented as a computing device (see e.g., FIG. 4). The computing device may be, for example, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the local storage device (110) described throughout this application and/or all, or a portion thereof, of the methods illustrated in FIGS. 2A-2C.

In one or more embodiments of the invention, the local storage device (110) is implemented as a logical device. The logical device may utilize the computing resources of any number of computing devices and thereby provide the functionality of the local storage device (110) described throughout this application and/or all, or a portion thereof, of the methods illustrated in FIGS. 2A-2C.

In one or more embodiments of the invention, the cloud storage devices (125) (e.g., cloud storage device A (120), cloud storage device (130)) are configured to store data, provide data to the local storage device (110), and provide data to the clients (100). The data that is stored by the cloud storage devices (125) may be, for example, metadata objects (122, 132) and data objects (124, 134).

In various embodiments of the invention, one (or more) cloud storage device(s) (e.g., cloud storage device A (120)) may receive metadata objects and data objects directly from the local storage device. Once a metadata object and/or a data object is stored on a given cloud storage device, it may also be replicated (e.g., mirrored) on another cloud storage device (e.g., cloud storage device B (130)). The metadata objects (122) and data objects (124) may be mirrored by sending copies of the metadata objects (122) and data objects (124) from one cloud storage device (e.g., cloud storage device A (120)) to another cloud storage device (e.g., cloud storage device B (130)). The aforementioned replication between the various cloud storage devices may occur in a manner that is different than the manner in which the data is initially migrated from the local storage device to one of the cloud storage devices. For example, the local storage device may transfer a metadata object followed by the related data objects. However, when objects are transferred between the different cloud storage devices, the cloud storage device may transfer all metadata objects and then transfer all data objects. Other ordering of the objects may be implemented between the cloud storage devices without departing from the invention.

Further, while the intent of the replication or mirroring between the cloud storage devices is to have at least two copies of a given object storage across the cloud storage devices (125), the cloud storage devices, at any point in time, may not include the same content. Said another way, there may be period of time during which there may be an object present on one cloud storage device (e.g., cloud storage device A (120)) that is not present on another cloud storage device (e.g., cloud storage device B (130)).

In one or more embodiments of the invention, the cloud storage devices (125) are implemented as a computing device (see e.g., FIG. 4). A computing device may be, for example, a tablet computer, a laptop computer, a desktop computer, a server, a distributed computing system, or a cloud resource (which may be a third-party cloud storage service). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the cloud storage devices (125) described throughout this application.

In one or more embodiments of the invention, the cloud storage devices (120, 130) are implemented as logical devices. The logical device may utilize the computing resources of any number of computing devices and thereby provide the functionality of cloud storage devices (120, 130) described throughout this application.

Figure 2A:
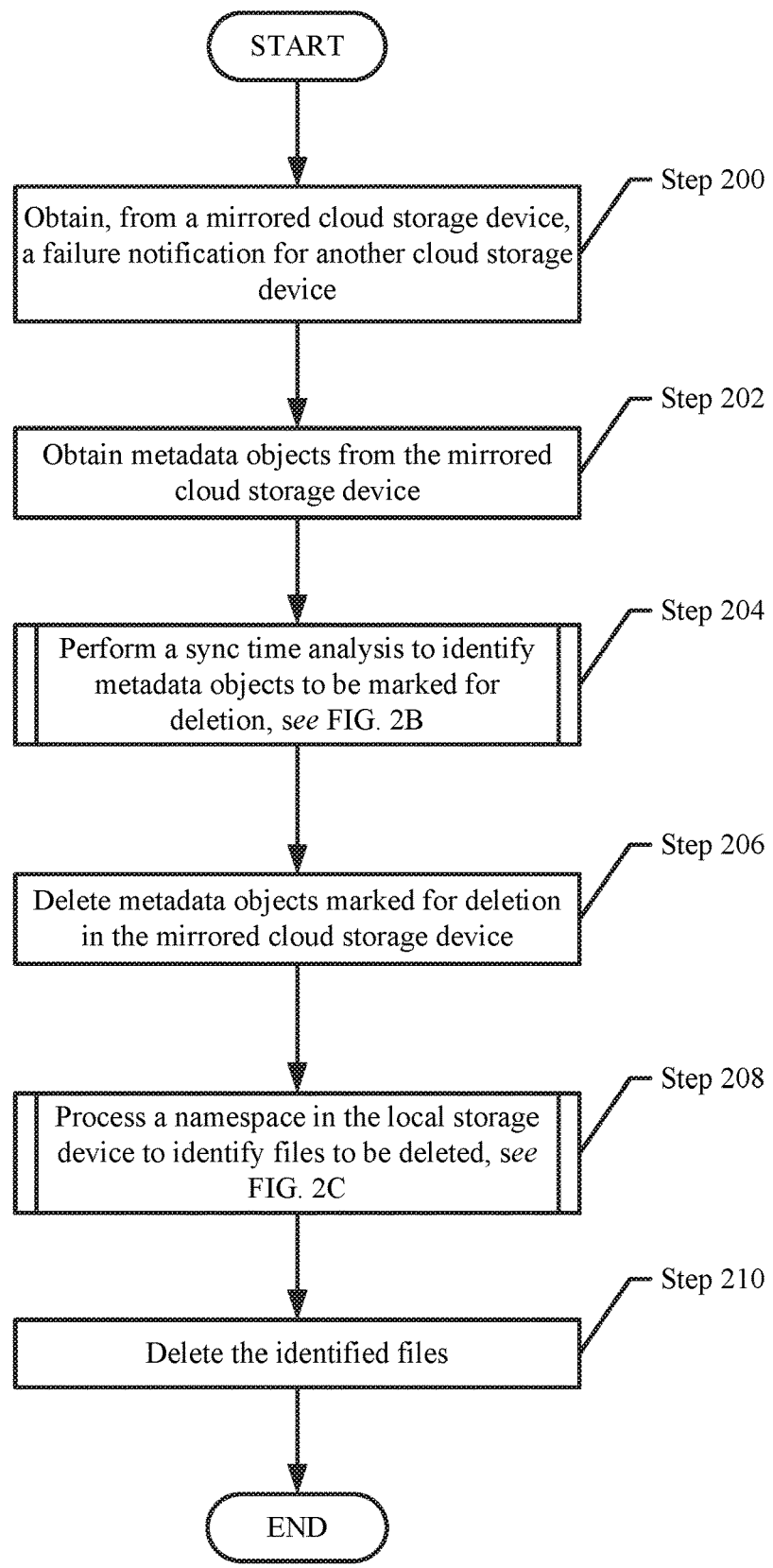
FIG. 2A shows a flowchart for taking action in response to an inaccessible cloud storage device being detected in accordance with one or more embodiments of the invention.
Figure 2B:
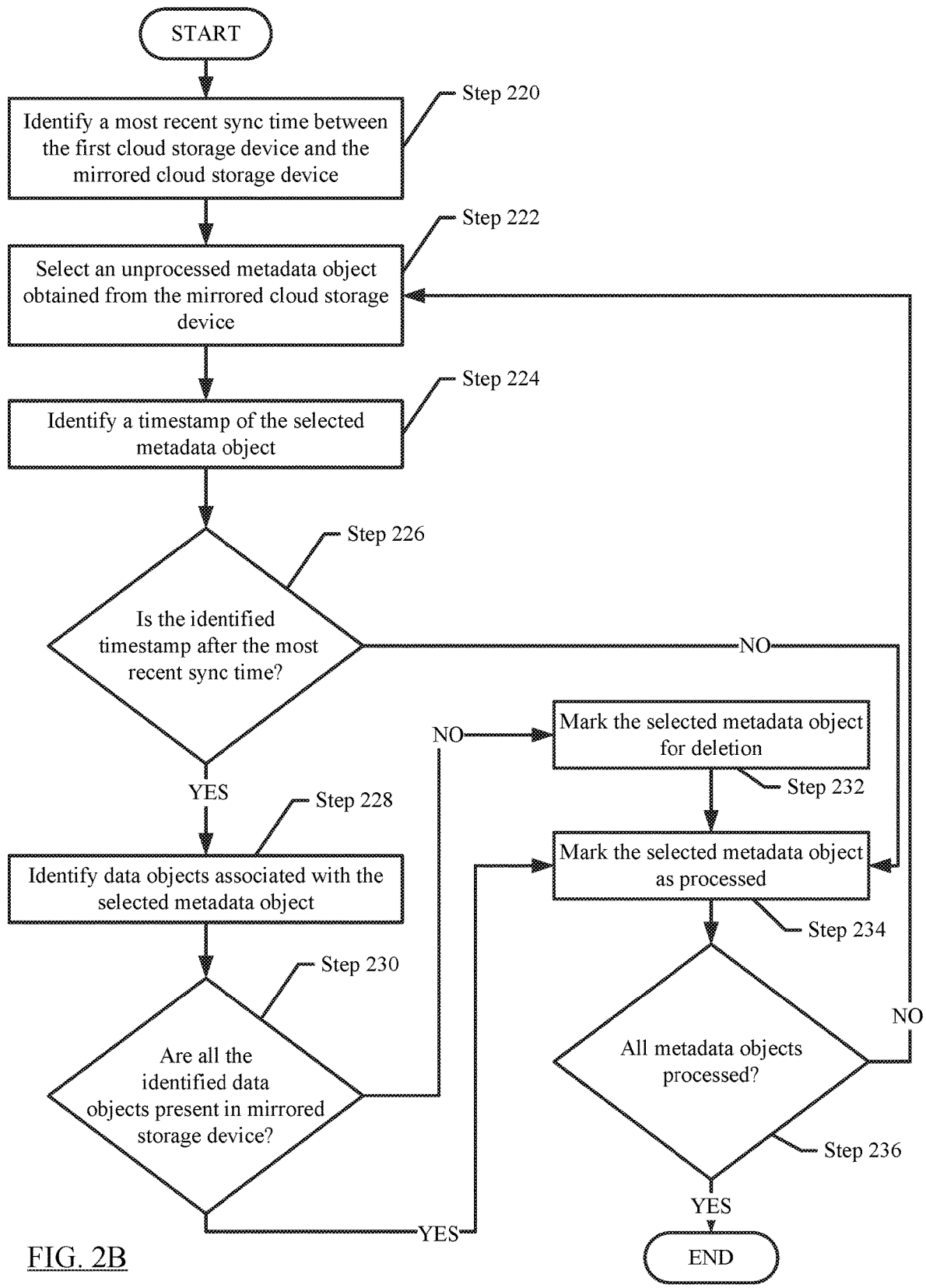
FIG. 2B shows a flowchart for performing a sync time analysis in accordance with one or more embodiments of the invention.
Figure 2C:
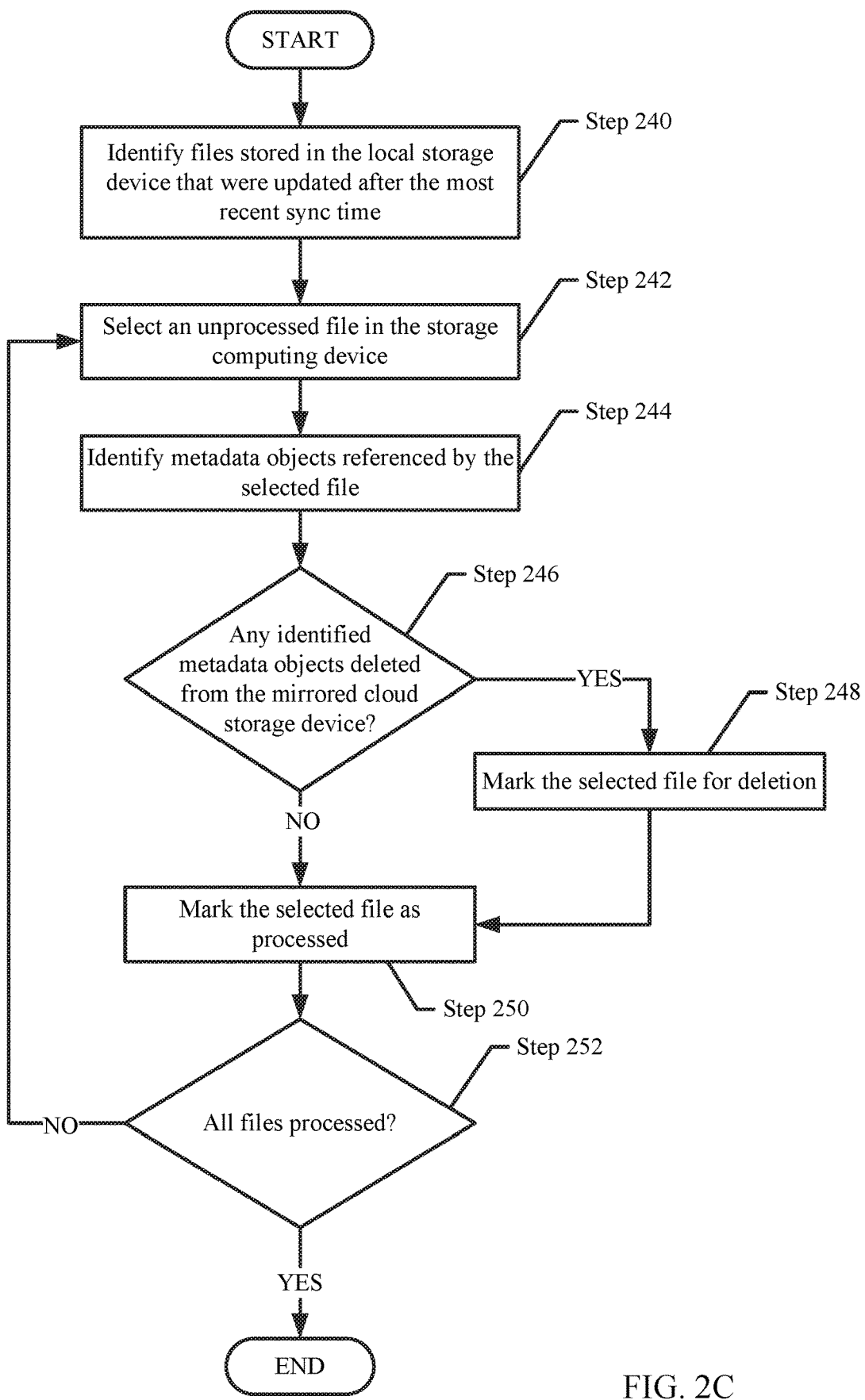
FIG. 2C shows a flowchart for updating a namespace in accordance with one or more embodiments of the invention.

FIGS. 2A-2C show flowcharts in accordance with one or more embodiments of the invention. More specifically, FIGS. 2A-2C show a method for actions that may be performed in response to a cloud storage device (e.g., FIG. 1, cloud storage device A (120)) becoming inaccessible to the local storage device.

While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for taking action in response to an inaccessible cloud storage device being detected in accordance with one or more embodiments of the invention. The method shown in FIG. 2A may be performed by, for example, a local storage device (110, FIG. 1). Other components of the system illustrated in FIG. 1 may perform the method of FIG. 2A without departing from the invention.

Turning to FIG. 2A, in Step 200, a failure notification for a cloud storage device is obtained. The failure notification may be sent by another cloud storage device (also referred to as the mirrored cloud storage device) (e.g., a cloud storage device that is replicating or mirroring the data from the cloud storage device; see e.g., FIG. 1, 130).

As discussed above, because the local storage device is directly communicating with the cloud storage device (e.g., FIG. 1, 120), the local storage device has a consistent view (i.e., accurate information) about the metadata objects and the data objects that are stored on the cloud storage device. However, in various embodiments of the invention, the local storage device does not have any visibility (or very limited visibility) on the transfer of metadata objects and data objects between the cloud storage device (e.g., FIG. 1, 120) and the mirrored cloud storage device (e.g., FIG. 1, 130). Accordingly, when the cloud storage device becomes unavailable or inaccessible, the local storage device may need to perform various steps (e.g., FIGS. 2A-2C) in order to: (i) determine what metadata objects and data objects are present on the mirrored cloud storage device and (ii) use this information to update its namespace. Once this occurs, the cloud storage device that was initially the mirrored cloud storage device, becomes the cloud storage device (e.g., the cloud storage device that is receiving the migrated metadata and data objects from the local storage device).

Continuing with the discussion of FIG. 2A, in Step 202, metadata objects are obtained from the mirrored cloud storage device.

In Step 204, a sync time analysis is performed to identify metadata objects to be marked for deletion. The sync time analysis may include processing each metadata object, identifying a point in time in which the metadata was mirrored to the mirrored cloud storage device, and identifying whether all data objects referenced by the metadata objects were mirrored to the mirrored cloud storage device. Based on the sync time analysis, one or more metadata objects may be marked for deletion. The sync time analysis may be performed in accordance with FIG. 2B. Other methods for determining which metadata objects to mark for deletion may be used without departing from the invention.

In Step 206, metadata objects marked for deletion are deleted in the mirrored cloud storage device. The local storage device may prompt the cloud storage device to delete the metadata objects that are marked from deletion in Step 204.

In Step 208, a namespace in the local storage device is processed to identify files to be deleted. The namespace is processed by identifying files that were modified (e.g., by a client) after a most recent sync time between the cloud storage device (i.e., the first cloud storage device in step 200) and the mirrored cloud storage device and determining whether metadata objects referenced by these files were fully mirrored on the mirrored cloud storage device. Any files that reference metadata objects that are not in the mirrored cloud storage device may be marked for deletion.

In Step 210, the identified files are deleted from the local storage device.

After step 210, the local storage device and the mirrored cloud storage device have a consistent view of which files are stored on the mirrored cloud storage device. This allows the mirrored cloud storage device to become the cloud storage device to which the local storage device migrates files. Further, the local storage device may use its understanding of the files on the mirrored cloud storage device to determine which files from the client need to be transferred to the mirrored cloud storage device.

FIG. 2B shows a flowchart for performing a sync time analysis in accordance with one or more embodiments of the invention. The method shown in FIG. 2B may be performed by, e.g., a local storage device (110, FIG. 1). Other components of the system illustrated in FIG. 1 may perform the methods of FIG. 2B without departing from the invention.

In Step 220, a most recent sync time between the cloud storage device and the mirrored cloud storage device is identified. A sync time may be a point in time in which the data objects and metadata objects on the cloud storage device (e.g., FIG. 1, 120) are present on the mirrored cloud storage device (e.g., FIG. 1, 120). The most recent sync time may be recorded by the mirrored cloud storage device.

In Step 222, an unprocessed metadata object obtained from the mirrored cloud storage device is selected. The unprocessed metadata object may be selected in any order without departing from the invention.

In Step 224, a timestamp of the selected metadata object is identified. In one or more embodiments of the invention, the timestamp specifies a point in time in which the metadata object was stored on the mirrored cloud storage device. The timestamp may be stored in the selected metadata object.

In Step 226, a determination is made about whether the identified timestamp is after the most recent sync time. If the identified timestamp is after the most recent sync time, the method may proceed to Step 228. If the identified timestamp is not after the most recent sync time, the method may proceed to Step 234.

In Step 228, data objects associated with the metadata objects are identified. The identified data objects may be data objects referenced by the selected metadata object and, as such, this information may be present in the metadata object. If the selected metadata object was stored on the mirrored cloud storage device after the most recent sync time, it is possible that not all data objects referenced by the selected metadata object were mirrored to the mirrored cloud storage device. Step 230 may address such scenarios.

In Step 230, a determination is made about whether all the identified data objects are present in the mirrored storage device. If all identified data objects are not present, the method may proceed to Step 232. If the all identified data objects are present, the method may proceed to Step 234.

In Step 232, the selected metadata object is marked for deletion.

In Step 234, the selected metadata object is marked as processed.

In Step 236, a determination is made about whether all metadata objects are processed. If all metadata objects are processed, the method may end following Step 236. If not all metadata objects are processed, the method may proceed to Step 222.

FIG. 2C shows a flowchart for updating a namespace in accordance with one or more embodiments of the invention. The method shown in FIG. 2C may be performed by, e.g., a local storage device (110, FIG. 1). Other components of the system illustrated in FIG. 1 may perform the method of FIG. 2C without departing from the invention.

In Step 240, files that stored in the local storage device that were updated after the most recent sync time are identified. In one or more embodiments of the invention, each file includes (or is associated with) a timestamp corresponding to the time the file was last updated. A file may be updated by adding, removing, and/or modifying metadata objects and/or data objects referenced by the file.

In Step 242, an unprocessed identified file from the set of files identified in step 240 is selected. The unprocessed file may be selected in any order without departing from the invention.

In Step 244, metadata objects referenced by the selected file are identified. The metadata objects may be stored in the mirrored storage device and/or obtained by the local storage device. Any number of the metadata objects referenced by the selected file may have been deleted as part of Steps 204-206 of the method of FIG. 2A.

In Step 246, a determination is made about whether any identified metadata objects were deleted from the mirrored cloud storage device or otherwise not present on the cloud storage device. If any identified metadata objects were deleted from (or not present on) the mirrored cloud storage device, the method may proceed to Step 248. If no identified metadata objects were deleted, the method may proceed to Step 250.

In Step 248, the selected file is marked for deletion on the local storage device.

In Step 250, the selected file is marked as processed.

In Step 252, a determination is made about whether all files (i.e., the files identified in step 240) are processed. If not all files are processed, the method may proceed to Step 242. If all files are processed, the method may end following Step 252.

EXAMPLE

The following section describes an example. The example is not intended to limit the invention. Turning to the example, consider a scenario in which a local storage device (300) includes a namespace (310) with the following file identifiers: File 1 Identifier (302), File 2 Identifier (304), and File 3 Identifier (306). The file identifiers (302, 304, 306) may reference the following metadata objects: Metadata Object A (302A), Metadata Object B (304A), Metadata Object C (306A) and the following data objects: Data Object A (302B), Data Object B (304B), Data Object C (306B). Metadata object A (302A) may be associated with data object A (302B), metadata object B (304A) may be associated with data object B (304B), and metadata object C (306A) may be associated with data object C (306B). The metadata objects (302A, 304A, 306A) and data objects (302B, 304B, 306B) may be stored in the local storage device (300) and on one or both cloud storage devices (320, 330).

Time=T1

At T1, metadata object B (304A) and data object B (304B) are stored in cloud storage device A (320). Further, the cloud storage device (320) has mirrored the metadata object B (304A) and data objects B (304B) to cloud storage device B (330). At this point in time, the cloud storage devices (320, 330) may be in sync. In other words, the two cloud storages may include the same data. For purposes of this example, T1 is a most recent sync time between the cloud storage devices (320, 330).

Time=T2

At T2, metadata object C (306A) and data object C (306B) are also stored in cloud storage device A (320). Further, cloud storage device A (320) is in the process of mirroring the metadata object (306A) and data object (306B) to cloud storage device B (330). As a result, a copy of metadata object C (306A) is stored on cloud storage device B (330).

Time=T3

At T3, cloud storage device A (320) goes offline. As such, the local storage device (300) no longer has access to the data stored in cloud storage device A (320). At this point in time, only metadata object C (306A) was mirrored to cloud storage device B (330) after the most recent sync time. Cloud storage device B (330) subsequently sends a failure notification to the local storage device (300). The local storage device (300) may perform the methods of FIGS. 2A-2C to identify that metadata object C (306A) is to be marked for deletion because it references data object C (306B), which is not present on cloud storage device B (330).

Time=T4

At T4, metadata object C (306A) is deleted. The local storage device (300) further performs the methods of FIGS. 2A-2C to identify that file identifier 3 (306) should be marked for deletion because it references a metadata object (i.e., 306A) that has been deleted.

Time=T5

Figure 3A:
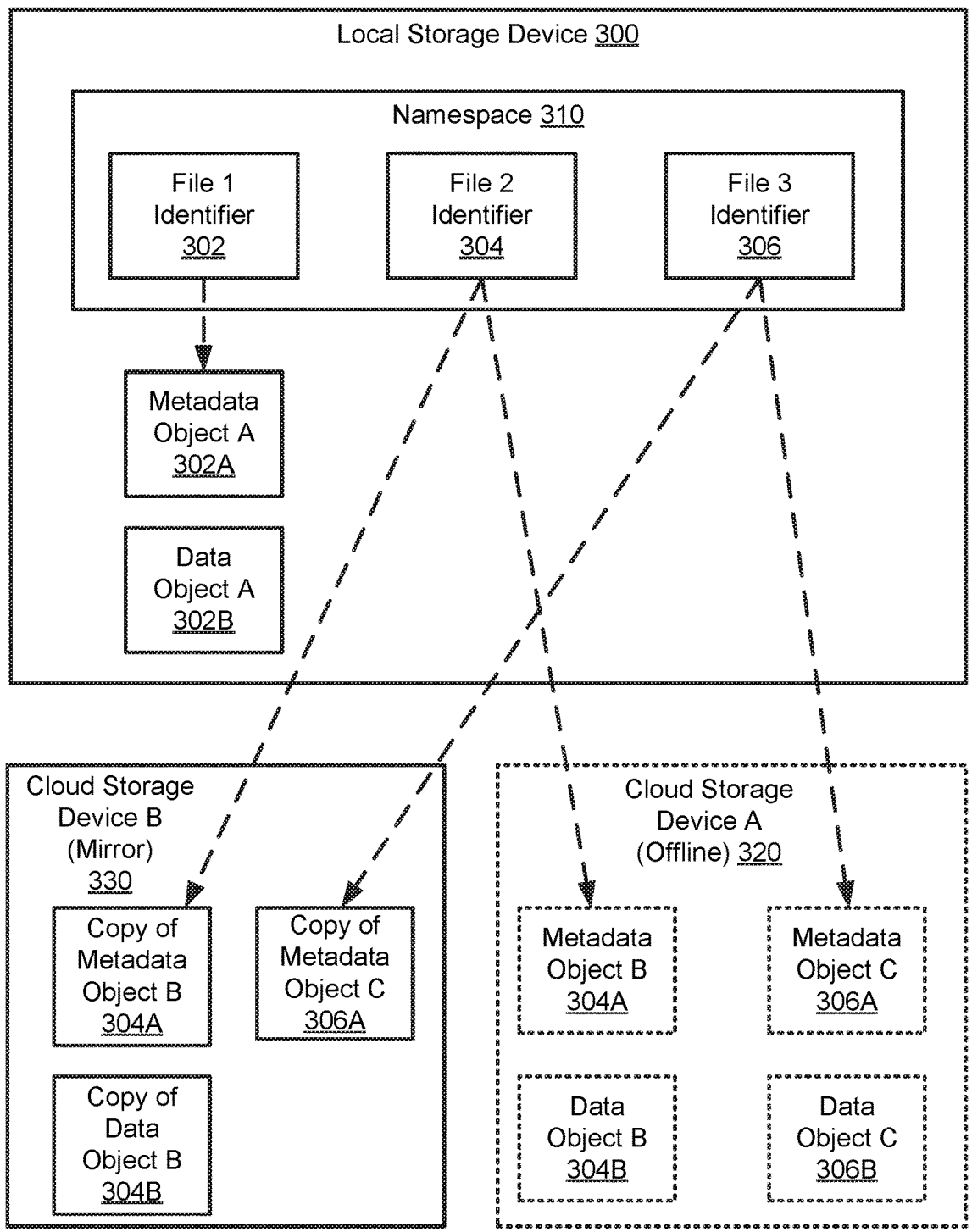
FIGS. 3A-3B show an example in accordance with one or more embodiments of the invention.
Figure 3B:
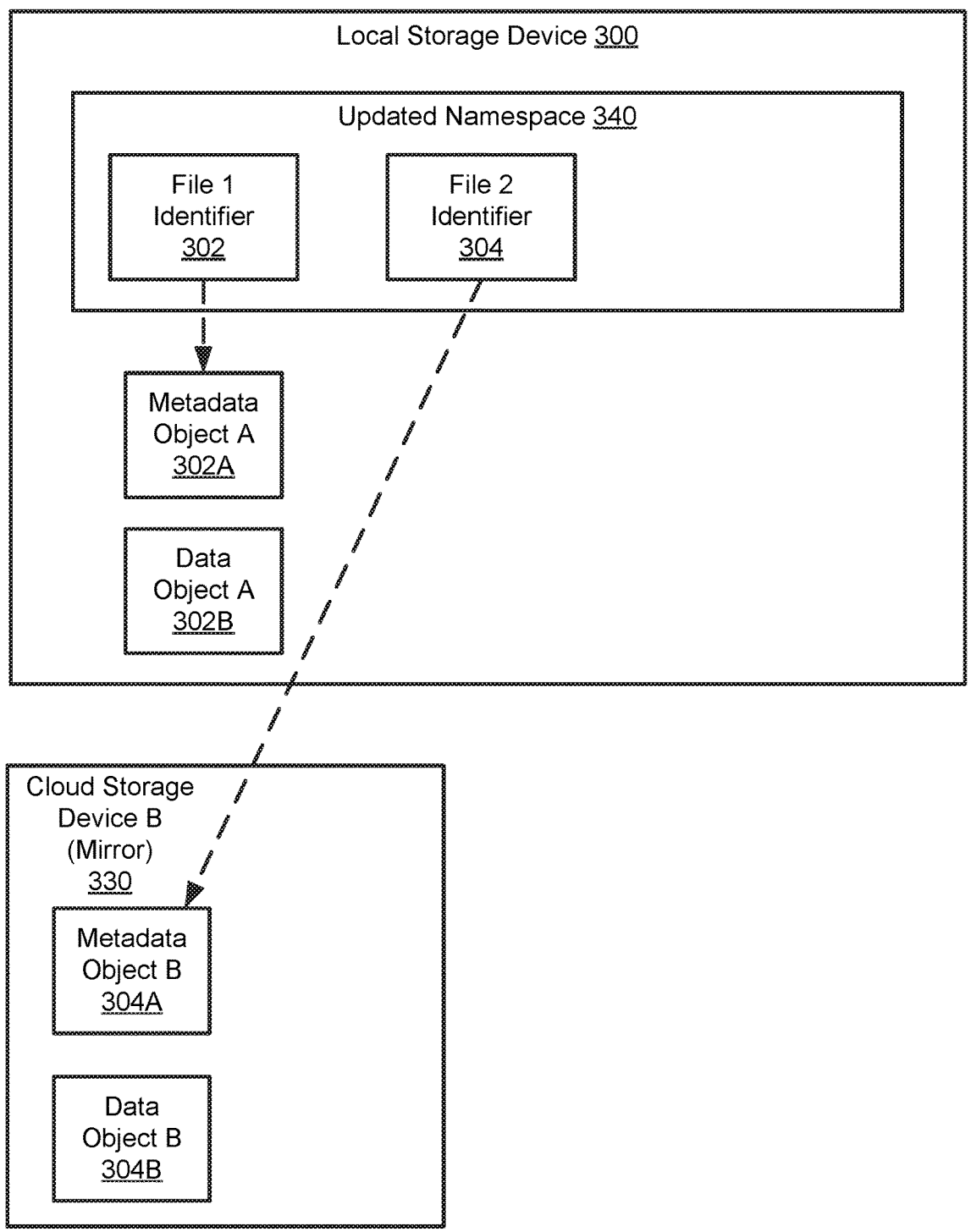

At T5, file identifier 3 (306) is deleted. FIG. 3B shows the local storage device (300) with an updated namespace (340). The updated namespace only includes identifiers for Files 2 and 3. Further, the File 2 identifier (304) now only references the metadata object (304A) located in the mirrored cloud storage device (330).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the reliability of storing data on a computing device. The reliability may be improved by updating a namespace stored in the computing device so that in the event of a cloud storage device going offline unexpectedly, files with incomplete data stored in a mirrored cloud storage device may be identified and deleted.

Because data from a cloud storage device may be transmitted to a second cloud storage device in an asynchronous order (e.g., in an order different from that in which the data was originally written) at a time after a point of consistency between the two cloud storage devices, any number of files in the second cloud storage may have incomplete data if the cloud storage device goes offline during the transmission. Instead of removing all of the data transmitted during the time after the point of consistency, embodiments of the invention may search for a portion of metadata in the second cloud storage device that references data that was not transmitted and may only remove this data.

By removing only files that are incomplete and not all files sent after a point of consistency, embodiments of the invention minimize the data loss and maintain consistency of data between a cloud storage device and a local storage device utilizing the data.

Thus, embodiments of the invention may address the problem of inconsistent file views between asynchronously updated storage devices. This problem arises due to the technological nature of the environment in which local and cloud storage devices operation and store/replicate data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data that is initially stored in a local storage device, a copy of the data is replicated to a second cloud storage device after the data is stored in the local storage device, and a portion of the copy of the data is migrated from the second cloud storage device to a first cloud storage device in a manner that results in inconsistency between the data stored in the local storage device and the portion of the copy of the data stored in the first cloud storage device, the method comprising:
  in response to a first determination that the first cloud storage device has transitioned from being accessible to being inaccessible to the local storage device, obtaining metadata objects associated with the portion of the copy of the data from the second cloud storage device;
  identifying, based on a sync time analysis of the portion of the copy of the data, at least one metadata object of the metadata objects to be deleted based on a point in time identified by the sync time analysis;
  initiating deletion of the at least one metadata object on the second cloud storage device, wherein the second cloud storage device is accessible to the local storage device; and
  updating, after initiating the deletion of the at least one metadata object, a namespace associated with the data on the local storage device to delete all portions of the data stored after the point in time identified by the sync time analysis.

2. The method of claim 1, wherein the metadata objects comprise information regarding deduplication of the data.

3. The method of claim 1, wherein the sync time analysis comprises uses a most recent sync time to determine that the at least one metadata object is to be deleted from the second cloud storage device, wherein the point in time is the most recent sync time.

4. The method of claim 1, wherein updating the namespace on the local storage device comprises deleting a file identifier associated with the at least one metadata object.

5. A local storage device that stores data, replicates a copy of the data to a second cloud storage device, and a portion of the copy of the data is migrated from the second cloud storage device to a first cloud storage device in a manner that results in inconsistency between the data stored in the local storage device and the portion of the copy of the data stored in the first cloud storage device, comprising:
  persistent storage; and
  a processor that performs a method comprising:
    in response to a first determination that the first cloud storage device has transitioned from being accessible to being inaccessible to the local storage device, obtaining metadata objects associated with the portion of the copy of the data from the second cloud storage device;
    identifying, based on a sync time analysis of the portion of the copy of the data, at least one metadata object of the metadata objects to be deleted based on a point in time identified by the sync time analysis;
    initiating deletion of the at least one metadata object on the second cloud storage device, wherein the second cloud storage device is accessible to the local storage device; and
    updating, after initiating the deletion of the at least one metadata object, a namespace associated with the data on the local storage device to delete all portions of the data stored after the point in time identified by the sync time analysis.

6. The local storage device of claim 5, wherein the sync time analysis comprises using a most recent sync time to determine that the at least one metadata object is to be deleted from the second cloud storage device, wherein the point in time is the most recent sync time.

7. The local storage device of claim 5, wherein updating the namespace on the local storage device comprises deleting a file identifier associated with the at least one metadata object.

8. A non-transitory computer readable medium comprising computer readable program code, which when executed by a computer processor enables the computer processor to perform a method for managing data that is initially stored in a local storage device, a copy of the data is replicated to a second cloud storage device after the data is stored in the local storage device, and a portion of the copy of the data is migrated from the second cloud storage device to a first cloud storage device in a manner that results in inconsistency between the data stored in the local storage device and the portion of the copy of the data stored in the first cloud storage device, the method comprising:
  in response to a first determination that the first cloud storage device has transitioned from being accessible to being inaccessible to the local storage device, obtaining metadata objects associated with the portion of the copy of the data from the second cloud storage device;
  identifying, based on a sync time analysis of the portion of the copy of the data, at least one metadata object of the metadata objects to be deleted based on a point in time identified by the sync time analysis;
  initiating deletion of the at least one metadata object on the second cloud storage device, wherein the second cloud storage device is accessible to the local storage device; and
  updating, after initiating the deletion of the at least one metadata object, a namespace associated with the data on the local storage device to delete all portions of the data stored after the point in time identified by the sync time analysis.

9. The non-transitory computer readable medium of claim 8, wherein the metadata objects comprise information regarding deduplication of the data.

10. The non-transitory computer readable medium of claim 8, wherein the sync time analysis uses a most recent sync time to determine that the at least one metadata object is to be deleted from the second cloud storage device.

11. The non-transitory computer readable medium of claim 8, wherein updating the namespace on the local storage device comprises deleting a file identifier associated with the at least one metadata object.

12. The method of claim 1, wherein the local storage device is a separate device from the first cloud storage device.

13. The method of claim 12, wherein the first cloud storage device is a separate device from the second cloud storage device.

14. The method of claim 1, wherein the copy of the data is consistent with the data.

15. The local storage device of claim 5, wherein the local storage device is a separate device from the first cloud storage device.

16. The local storage device of claim 15, wherein the first cloud storage device is a separate device from the second cloud storage device.

17. The local storage device of claim 5, wherein the copy of the data is consistent with the data.

18. The non-transitory computer readable medium of claim 8, wherein the local storage device is a separate device from the first cloud storage device.

19. The non-transitory computer readable medium of claim 18, wherein the first cloud storage device is a separate device from the second cloud storage device.

20. The non-transitory computer readable medium of claim 8, wherein the copy of the data is consistent with the data.

\* \* \* \* \*